Dec. 19, 1967 TAKEO MIURA ET AL 3,359,502

DIFFERENTIAL MAGNETIC AMPLIFIER CIRCUIT

Filed April 16, 1964

INVENTOR.
Takeo Miura
Akio Miyamoto
Chikafusa Hirano

Wenderoth & Wenderoth

United States Patent Office 3,359,502

Patented Dec. 19, 1967

3,359,502

DIFFERENTIAL MAGNETIC AMPLIFIER CIRCUIT

Takeo Miura and Akio Miyamoto, Kitatama-gun, Tokyo-to, and Chikafusa Hirano, Hachioji-shi, Japan, assignors to Kabushiki Kaisha Hitachi Seisakusho, Chiyoda-ku, Tokyo-to, Japan, a joint-stock company of Japan Filed Apr. 16, 1964, Ser. No. 360,235
Claims priority, application Japan, May 15, 1963, 38/24,074
1 Claim. (Cl. 330—8)

ABSTRACT OF THE DISCLOSURE

A differential magnetic amplifier circuit having first and second magnetic amplifiers, constructed so that the difference voltage between a reference voltage and the sum of the output voltages of said amplifiers is negatively fed back to the respective input sides of said amplifiers in order to maintain the sum of the output voltages at a constant value.

This invention relates to a new magnetic amplifier circuit having characteristics which are extremely stable with respect to disturbing effects such as change of ambient temperature and variation of power source voltage.

In a push-pull magnetic amplifier of the type wherein the difference in the output voltages of two magnetic amplifiers appears in the output thereof, fluctuations in the outputs of the two magnetic amplifiers due to ambient conditions of circumstance such as power source voltage and ambient temperature do not appear in the output because the components of variation of the same polarity balance out. Accordingly, amplifiers of this type are widely used as stable amplifiers.

However, in a push-pull amplifier of the above stated character, when the output levels of the two magnetic amplifiers are caused by ambient conditions to vary, the gain of the amplifier varies in many cases, and the range of linear characteristic varies as will be described in detail hereinafter. Therefore, this type of amplifier cannot be said to be completely unaffected by the ambient conditions.

It is an object of the present invention to overcome this disadvantage of conventional push-pull magnetic amplifier circuits and to provide a differential magnetic amplifier circuit having characteristics which are extremely stable with respect to ambient conditions.

Briefly described, the invention resides in a differential magnetic amplifier circuit characterized by an arrangement comprising first and second magnetic amplifiers, a negative feedback circuit which compares the sum of the outputs of the said magnetic amplifiers and a reference to obtain a difference signal and causes the difference signal so obtained to be negatively fed back to the input sides of the said magnetic amplifiers, and an output circuit for producing the difference of the outputs of the said magnetic amplifiers, the said arrangement being so adapted that the sum of the said outputs is always maintained at a constant value.

The specific nature, principle, and details of the invention will be more clearly apparent by reference to the following description when taken in conjunction with the accompanying drawing in which.

Figures 1, 2, 3:
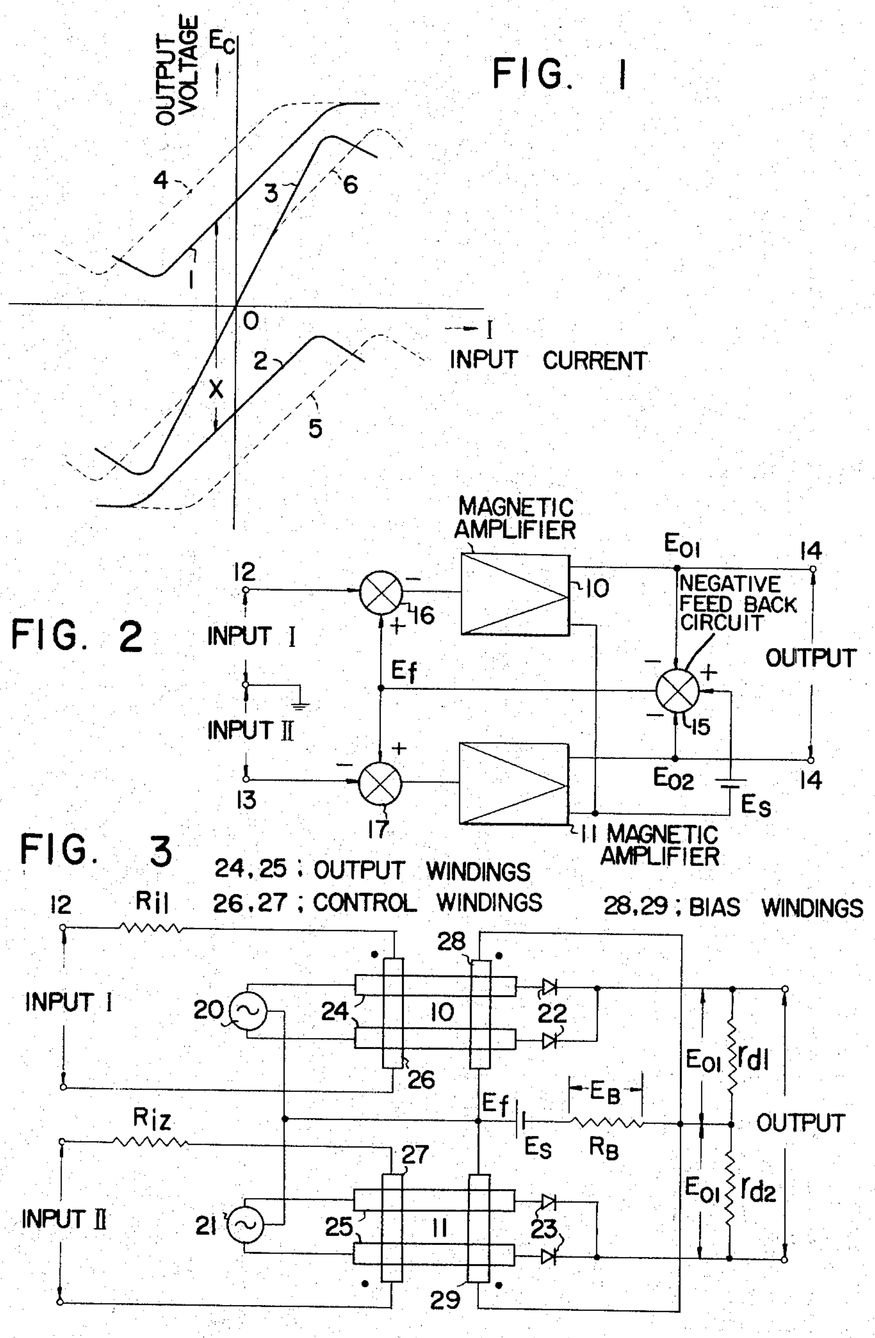
FIGURE 1 is a graphical representation showing transfer characteristic curves of a push-pull magnetic amplifier.
FIGURE 2 is a schematic diagram indicating the principle of the amplifier circuit of the invention.
FIGURE 3 is a circuit diagram indicating a preferred embodiment of the invention.

As an example of variations due to ambient conditions of output levels and range of linear characteristic of a push-pull magnetic amplifier, the input current versus output voltage characteristics of the two magnetic amplifiers in such a push-pull magnetic amplifier will now be considered to be, at a certain ambient temperature $T_1$ degrees C., as indicated by curves 1 and 2 in FIGURE 1. Then, the push-pull characteristic due to graphical summation of these characteristics, will be as indicated by curve 3. If, with respect to these input-output characteristics, the ambient temperature varies from $T_1$ to $T_2$ degrees C., the characteristics of the two magnetic amplifiers will respectively vary from curves 1 and 2 to curves 4 and 5. Accordingly, the push-pull characteristic resulting from graphical summation of these characteristics represented by curves 4 and 5 will vary from curve 3 to curve 6. From a comparison of curves 3 and 6, it will be observed that the slopes, that is the gains, and the regions of linear characteristics of these two curves are different, indicating the appreciable influence of the ambient temperature variation.

The output $E_0$ of a conventional push-pull magnetic amplifier is equal to the difference between the respective outputs $E_{01}$ and $E_{02}$ of the individual magnetic amplifiers. That is, $E_0=E_{01}-E_{02}$, for example. The above mentioned undesirable variation in the output characteristic due to variation of the ambient conditions is caused by the state wherein the magnitudes of the outputs $E_{01}$ and $E_{02}$ of the two magnetic amplifiers are left unlimited.

Then, in view of the above consideration, if the push-pull amplifier is caused to fulfil the condition of constant sum of the two outputs, that is, $E_{01}+E_{02}=$(constant), irrespectively of the input I, that is, the condition whereby the distance X in FIGURE 1 is maintained constant, the output characteristic can be maintained always constant, unrelatively to variations of the ambient conditions, as represented by curve 3. In this case, the original push-pull output relationship $E_0=E_{01}-E_{02}$ is not affected in any manner whatsoever.

In practice, the above mentioned condition $$E_{01}+E_{02}=\text{(constant)}$$

can be fulfilled and maintained according to the present invention by providing means to obtain the difference between a reference voltage $E_s$ defined by the line X in FIGURE 1 and the output sum $E_{01}+E_{02}$) of the two magnetic amplifiers and to negatively feed back this difference to the input sides of the two amplifiers.

The principle of the present invention may be further described with respect to the schematic arrangement illustrated in FIGURE 2, in which there are provided: first and second magnetic amplifiers 10 and 11; input terminals 12 and 13 of the amplifiers 10 and 11 and the above stated characteristic curve of FIG. 1 is obtained by impressing the same input voltage on both terminals 12 and 13; output terminals 14, 14 for obtaining the difference between the outputs $E_{01}$ and $E_{02}$ of the amplifiers; a circuit 15 for obtaining the sum of the outputs $E_{01}$ and $E_{02}$, subtracting this sum from a reference voltage $E_s$, and obtaining a negative feedback signal $E_f=E_s-(E_{01}+E_{02})$; and circuits 16 and 17 for applying the negative feedback signal $E_f$ to the input sides of the amplifiers 10 and 11. If, in this arrangement, the loop gain is amply large, balance can be attained in the state represented by $E_s=E_{01}+E_{02}$ according to known theory relating to negative feedback circuits.

In a preferred embodiment of the invention as illustrated by the specific arrangement shown in FIGURE 3, there are arranged as shown: A-C sources 20 and 21 of magnetic amplifiers 10 and 11; rectifiers 22 and 23; input resistances $R_{11}$ and $R_{12}$; a resistance $R_B$ for obtaining the aforementioned negative feedback signal $E_f$, and dummy loads $r_{d1}$ and $r_{d2}$. The magnetic amplifiers 10 and 11 are provided respectively with output windings 24 and 25, control windings 26 and 27, and bias windings 28 and 29.

In the operation of the circuit shown, when a positive voltage is applied to the sides designated by circular dots (·) of the control windings 26 and 27 or the bias windings 28 and 29, the outputs $E_{o1}$ and $E_{o2}$ of the two magnetic amplifiers 10 and 11 are thereby controlled to become low. Currents due to the outputs $E_{o1}$ and $E_{o2}$ of the magnetic amplifiers flow by way of dummy loads $r_{d1}$ and $r_{d2}$ through the resistance $R_B$, producing a voltage drop $E_B$ across the resistance $R_B$ of a magnitude corresponding to the sum of the outputs $E_{o1}+E_{o2}$. This voltage drop $E_B$ is applied additively to a reference bias voltage $E_s$ with opposite polarity thereto, there by producing a feedback voltage $$E_f=E_s-E_B$$

which is then supplied to the bias windings 28 and 29. Thus, a negative feedback circuit similar to that in FIGURE 2 is formed.

As a result, the sum of the outputs $(E_{o1}+E_{o2})$ is always maintained at a constant value corresponding to the magnitude of the reference voltage $E_s$. At the same time, an output $E_o=E_{o1}-E_{o2}$ is obtained at the output terminals 14, 14.

As a result of the output sum $(E_{o1}+E_{o2})$ of the two magnetic amplifiers being controlled to be always at a constant value, disturbing effects such as change of gain caused by variation of power source voltage and fluctuation of the linear operation range are avoided, and the differential magnetic amplifier circuit according to the invention as described above is thereby capable of operating in an extremely stable manner with respect to change in the ambient conditions.

Furthermore, also in the case wherein an input I is applied to only the first magnetic amplifier 10, and no input is applied to the second magnetic amplifier 11 (that is, input II is zero), the condition of output sum $$E_{o1}+E_{o2}=\text{(constant)}$$

is maintained. Consequently, the output $E_{o2}$ is automatically controlled by an increment equal to the increment of the output $E_{o1}$ in the opposite direction relative to $E_{o1}$. That is, there is no necessity of applying identical inputs simultaneously to the two magnetic amplifiers as in the case of a conventional push-pull circuit.

In view of this advantageous feature, it is possible to apply separate signals I and II for the inputs of the amplifiers 10 and 11, respectively, and cause the sum or difference of these two signals to be produced as an output. Selection between the sum and the difference can be accomplished by changing the connection polarities of the control windings 26 and 27 of the two magnetic amplifiers. In this case, because of the special character of the construction of the magnetic amplifier circuit, it is possible to cause the sum or the difference of signals of mutually insulated potentials to be produced in the output.

Since the differential magnetic amplifier circuit of the present invention has an operation which is extremely stable with respect to the ambient conditions, it can be effectively used in various applications such as that as an operational amplifier of an analog computer for control. In addition, the amplifier of this invention is effectively applicable to uses such as those of servo-amplifiers and amplifiers for small inputs for which conventional push-pull magnetic amplifiers have heretofore been used.

It should be understood, of course, that the foregoing disclosure principally relates to only a preferred embodiment of the invention and that it is intended to cover all changes and modifications of the example of the invention herein chosen for the purposes of the disclosure, which do not constitute departures from the spirit and scope of the invention as set forth in the appended claim.

We claim:

A differential magnetic amplifier circuit having first and second magnetic amplifiers, which comprises: a reference signal source; means to produce a sum of the output signals of said amplifiers; means to produce a different signal between said reference signal and said sum of the output signals; means to negatively feed back said difference signal to the respective input sides of said magnetic amplifiers; and means to produce an output difference signal between said two output signals of said amplifiers, whereby said sum of the output signals of said amplifiers always is maintained at a constant value.

References Cited

UNITED STATES PATENTS

| | | | |
|---|---|---|---|
| 2,714,137 | 7/1955 | Dzwons | 330—83 |
| 2,833,871 | 5/1958 | Worthen | 330—81 |
| 3,172,054 | 3/1965 | Quilici et al. | 330—8 |

ROY LAKE, *Primary Examiner.*

NATHAN KAUFMAN, *Examiner.*